United States Patent
Skogö et al.

(10) Patent No.: US 10,678,897 B2
(45) Date of Patent: *Jun. 9, 2020

(54) IDENTIFICATION, AUTHENTICATION, AND/OR GUIDING OF A USER USING GAZE INFORMATION

(71) Applicant: Tobii AB, Danderyd (SE)

(72) Inventors: Mårten Skogö, Danderyd (SE); Richard Hainzl, Danderyd (SE); Henrik Jönsson, Danderyd (SE); Anders Vennström, Danderyd (SE); Erland George-Svahn, Danderyd (SE); John Elvesjö, Danderyd (SE); Mattias Gustavsson, Danderyd (SE)

(73) Assignee: Tobii AB, Danderyd (SE)

( * ) Notice: Subject to any disclaimer, the term of this patent is extended or adjusted under 35 U.S.C. 154(b) by 531 days.

This patent is subject to a terminal disclaimer.

(21) Appl. No.: 15/395,502

(22) Filed: Dec. 30, 2016

(65) Prior Publication Data

US 2017/0109513 A1    Apr. 20, 2017

Related U.S. Application Data

(63) Continuation-in-part of application No. 15/131,542, filed on Apr. 18, 2016, now Pat. No. 10,192,109.

(Continued)

(51) Int. Cl.
*G06K 9/00* (2006.01)
*G06F 21/32* (2013.01)
(Continued)

(52) U.S. Cl.
CPC ............. *G06F 21/32* (2013.01); *G06F 3/013* (2013.01); *G06F 9/442* (2013.01); *G06F 21/316* (2013.01);
(Continued)

(58) Field of Classification Search
CPC ..... G06K 9/00–82; G06F 9/442; G06F 3/013; G06F 21/32
See application file for complete search history.

(56) References Cited

U.S. PATENT DOCUMENTS 5,387,952 A * 2/1995 Byer .................... A61B 3/0083 340/573.7
7,039,547 B2 * 5/2006 Wilson ............... A61B 5/04008 324/260

(Continued)

FOREIGN PATENT DOCUMENTS

JP    2008-198028 A    8/2008
JP    2014-534655 T    12/2014

(Continued)

OTHER PUBLICATIONS

Non-Final Office Action dated Aug. 25, 2017 for U.S. Appl. No. 15/131,542; all pages.

(Continued)

*Primary Examiner* — Sean T Motsinger
(74) *Attorney, Agent, or Firm* — Samuel Yamron

(57) ABSTRACT

According to the invention a system for authenticating a user of a device is disclosed. The system may include a first image sensor, a determination unit, and an authentication unit. The first image sensor may be for capturing at least one image of at least part of a user. The determination unit may be for determining information relating to the user's eye based at least in part on at least one image captured by the first image sensor. The authentication unit may be for authenticating the user using the information relating to the user's eye.

46 Claims, 5 Drawing Sheets

Related U.S. Application Data

(60) Provisional application No. 62/148,501, filed on Apr. 16, 2015.

(51) Int. Cl.
  *G06F 3/01* (2006.01)
  *G06F 9/4401* (2018.01)
  *G06F 21/31* (2013.01)

(52) U.S. Cl.
  CPC ..... *G06K 9/00335* (2013.01); *G06K 9/00597* (2013.01); *G06K 9/00604* (2013.01); *G06K 9/00617* (2013.01); *G06K 9/00906* (2013.01)

(56) References Cited

U.S. PATENT DOCUMENTS

| | | | |
|---|---|---|---|
| 8,235,529 B1 | 8/2012 | Raffle et al. | |
| 8,542,879 B1 | 9/2013 | Nechyba et al. | |
| 8,594,374 B1* | 11/2013 | Bozarth | G06F 21/36 382/103 |
| 8,856,541 B1 | 7/2014 | Chaudhury | |
| 9,355,612 B1 | 5/2016 | Shepard et al. | |
| 9,367,677 B1* | 6/2016 | Adhami | G06F 21/32 |
| 9,649,029 B2 | 5/2017 | Blixt et al. | |
| 2004/0003294 A1* | 1/2004 | Moore | G06F 21/316 726/21 |
| 2004/0068656 A1* | 4/2004 | Lu | G06F 21/34 713/172 |
| 2004/0128500 A1* | 7/2004 | Cihula | G06F 21/34 713/155 |
| 2007/0043950 A1* | 2/2007 | Imanishi | G06F 21/10 713/176 |
| 2007/0094742 A1* | 4/2007 | Morita | H04N 1/00408 726/26 |
| 2007/0132950 A1* | 6/2007 | Victor | A61B 3/036 351/200 |
| 2008/0216171 A1* | 9/2008 | Sano | H04L 9/32 726/19 |
| 2009/0092292 A1* | 4/2009 | Carver | A61B 5/1171 382/117 |
| 2009/0307601 A1* | 12/2009 | Kumhyr | G06F 21/84 715/741 |
| 2010/0299530 A1* | 11/2010 | Bell | G06F 21/32 713/186 |
| 2010/0328444 A1* | 12/2010 | Blixt | A61B 3/113 348/78 |
| 2011/0046845 A1* | 2/2011 | Kozlay | G06Q 10/06 701/31.4 |
| 2011/0302078 A1* | 12/2011 | Failing | B60L 3/00 705/39 |
| 2012/0194419 A1* | 8/2012 | Osterhout | G02B 27/0093 345/156 |
| 2012/0194784 A1* | 8/2012 | Shih | A61B 3/14 351/221 |
| 2013/0083007 A1 | 4/2013 | Geisner et al. | |
| 2013/0223696 A1* | 8/2013 | Azar | G06K 9/00892 382/118 |
| 2013/0336547 A1* | 12/2013 | Komogortsev | A61B 5/1171 382/117 |
| 2013/0342672 A1 | 12/2013 | Gray et al. | |
| 2014/0016837 A1 | 1/2014 | Nechyba et al. | |
| 2014/0055591 A1 | 2/2014 | Katz | |
| 2014/0211995 A1 | 7/2014 | Model | |
| 2014/0313129 A1 | 10/2014 | Elvesjo et al. | |
| 2014/0320397 A1 | 10/2014 | Hennessey et al. | |
| 2014/0337930 A1 | 11/2014 | Hoyos et al. | |
| 2015/0084864 A1 | 3/2015 | Geiss et al. | |
| 2015/0237499 A1* | 8/2015 | Tg | H04L 63/108 726/4 |
| 2015/0294464 A1 | 10/2015 | Kim et al. | |
| 2016/0070344 A1* | 3/2016 | Gohl | G06F 3/013 345/156 |
| 2016/0080732 A1 | 3/2016 | Pedley et al. | |
| 2016/0093136 A1 | 3/2016 | Lyons | |
| 2016/0188862 A1* | 6/2016 | Singh | H04L 63/0861 726/7 |
| 2016/0307038 A1 | 10/2016 | Skogö et al. | |
| 2016/0308859 A1 | 10/2016 | Barry et al. | |
| 2016/0335483 A1 | 11/2016 | Pfursich et al. | |
| 2017/0046813 A1 | 2/2017 | Wu et al. | |
| 2017/0061251 A1 | 3/2017 | Fan et al. | |
| 2017/0091549 A1 | 3/2017 | Gustafsson et al. | |
| 2017/0109513 A1* | 4/2017 | Skogo | G06F 21/32 |
| 2017/0180348 A1 | 6/2017 | Piccolotto et al. | |
| 2017/0185760 A1 | 6/2017 | Wilder | |
| 2017/0193285 A1 | 7/2017 | Negi et al. | |
| 2017/0235363 A1 | 8/2017 | Breisinger et al. | |
| 2018/0121608 A1* | 5/2018 | Gross | A61B 3/113 |
| 2018/0121724 A1* | 5/2018 | Ovsiannikov | G06K 9/00604 |

FOREIGN PATENT DOCUMENTS

| | | |
|---|---|---|
| JP | 2015-013031 A | 1/2015 |
| WO | 2016168814 | 10/2016 |
| WO | 2018/125563 A1 | 7/2018 |

OTHER PUBLICATIONS

Office Action dated Aug. 23, 2018 in related foreign Canada application No. CA 2,983,015, 6 pgs.
Notice of Allowance dated Sep. 13, 2018 in related U.S. Appl. No. 15/131,542, 9 pgs.
Office Action dated Nov. 6, 2018 in related foreign application No. 16721560.7, 37 pgs.
International Search Report and Written Opinion for PCT/US2017/066046 dated Jun. 1, 2018, all pages.
U.S. Appl. No. 15/131,542, filed Apr. 18, 2016 Final Rejection dated May 11, 2018, all pages.
Maeder et al., Gaze based user authentication for personal computer applications, Intelligent Multimedla, Video and Speech Processing, 2004. Proceedings of 2004 International Symposium on Hong Kong, China, Piscataway, NJ, USA,IEEE, XPO10801550, Oct. 20-22, 2004, pp. 727-730.
International Application No. PCT/US2016/028090, International Search Report and Written Opinion dated Jul. 13, 2016, 12 pages.
Rigas Ioannis et al., Gaze estimation as a framework for iris liveness detection, IEEE International Joint Conference on Biometrics, IEEE, XP032714790, Sep. 29, 2014, pp. 1-8.
EP Office Action dated Jun. 13, 2019 in related foreign application No. EP 16721560.7, 9 pgs.
David Rozado, "Using Gaze Based Passwords as an Authentication Mechanism for Password Input", ICT Centre-CSIRO, 4 pgs.
International Preliminary Report on Patentability dated Jul. 11, 2019 in related PCT application No. PCT/US2017/066046, 11 pgs.
Office Action dated Sep. 5, 2019 in related foreign application No. JP-2018-506086, 272 pgs.

* cited by examiner

IDENTIFICATION, AUTHENTICATION, AND/OR GUIDING OF A USER USING GAZE INFORMATION

CROSS-REFERENCE TO RELATED APPLICATIONS

This application is a continuation-in-part of U.S. patent application Ser. No. 15/131,542, entitled "IDENTIFICATION AND/OR AUTHENTICATION OF A USER USING GAZE INFORMATION," which claims priority to Provisional U.S. Patent Application No. 62/148,501 filed Apr. 16, 2016, entitled "IDENTIFICATION OR AUTHENTICATION OF A USER USING GAZE INFORMATION," the entire disclosures of which are hereby incorporated by reference, for all purposes, as if fully set forth herein.

BACKGROUND OF THE INVENTION

The present invention generally relates to systems and methods for user identification and/or authentication of a user using gaze information from the user, and in particular, to systems and methods for allowing a user to login to a device using such gaze information.

Security is of utmost importance in modern computing. With the increased mobility and power of computing devices, more and more devices are used by multiple users. Therefore accurately identifying and enabling multiple users to login to a device is of utmost importance.

Traditional identification and authentication systems rely on simple mechanisms such as password or passphrase authentication. This is troublesome as the system relies on a user's ability to remember the exact syntax of both a username and/or password. And often users must need to remember a multitude of potentially different usernames and password for different systems. Further such information can potentially be learned, extracted, copied or otherwise obtained from a user in order to be used to falsely login as the user.

It has been previously proposed to use other forms of identification and authentication to allow a user to login to a computing device. For example, many computing devices now comprise fingerprint sensors for scanning a user's fingerprint to facilitate logging in of the device. The problem with such systems is that the user must hold their finger still on a sensing surface for some period of time, and therefore impatience as well as additional issues such as dirt and other obstructions on the sensing surface or finger can impede the systems from functioning correctly.

Further, retina scanning technology has been proposed as an alternative authentication technique. In these systems a user's retina is scanned by a camera or the like and matched to a saved retinal profile, thus allowing the correct user to login to the computing device. This system also requires that the user remain still during scanning and thus there exists the potential for the system to fail.

Retina scanning and other facial scanning systems may also be fooled by methods such as scanning a photograph of a person or their eye. Accordingly, there is a need for an improved system to authenticate users as a live persons and allowing for login of a device.

Further there is a need for a contact-less login procedure that is individual to a user and allows the user to authenticate with a computing device, even when being observed by a third party.

BRIEF DESCRIPTION OF THE INVENTION

In one embodiment, a system for authenticating a user of a device is provided. The system may include a first image sensor, a determination unit, and an authentication unit. The first image sensor may be for capturing at least one image of at least part of a user. The determination unit may be for determining information relating to the user's eye based at least in part on at least one image captured by the first image sensor. The authentication unit may be for authenticating the user using the information relating to the user's eye.

In another embodiment, a method for authenticating a user of a device is provided. The method may include capturing at least one image of at least part of a user with a first image sensor. The method may also include determining information relating to the user's eye based at least in part on at least one image captured by the first image sensor. The method may further include authenticating the user using information relating to the user's eye.

In another embodiment, a non-transitory machine readable medium having instructions stored thereon for a method of authenticating a user of a device is provided. The method may include capturing at least one image of at least part of a user with a first image sensor. The method may also include determining information relating to the user's eye based at least in part on at least one image captured by the first image sensor. The method may further include authenticating the user using information relating to the user's eye.

BRIEF DESCRIPTION OF THE DRAWINGS

The present invention is described in conjunction with the appended figures.

DETAILED DESCRIPTION OF THE INVENTION

Figure 1:
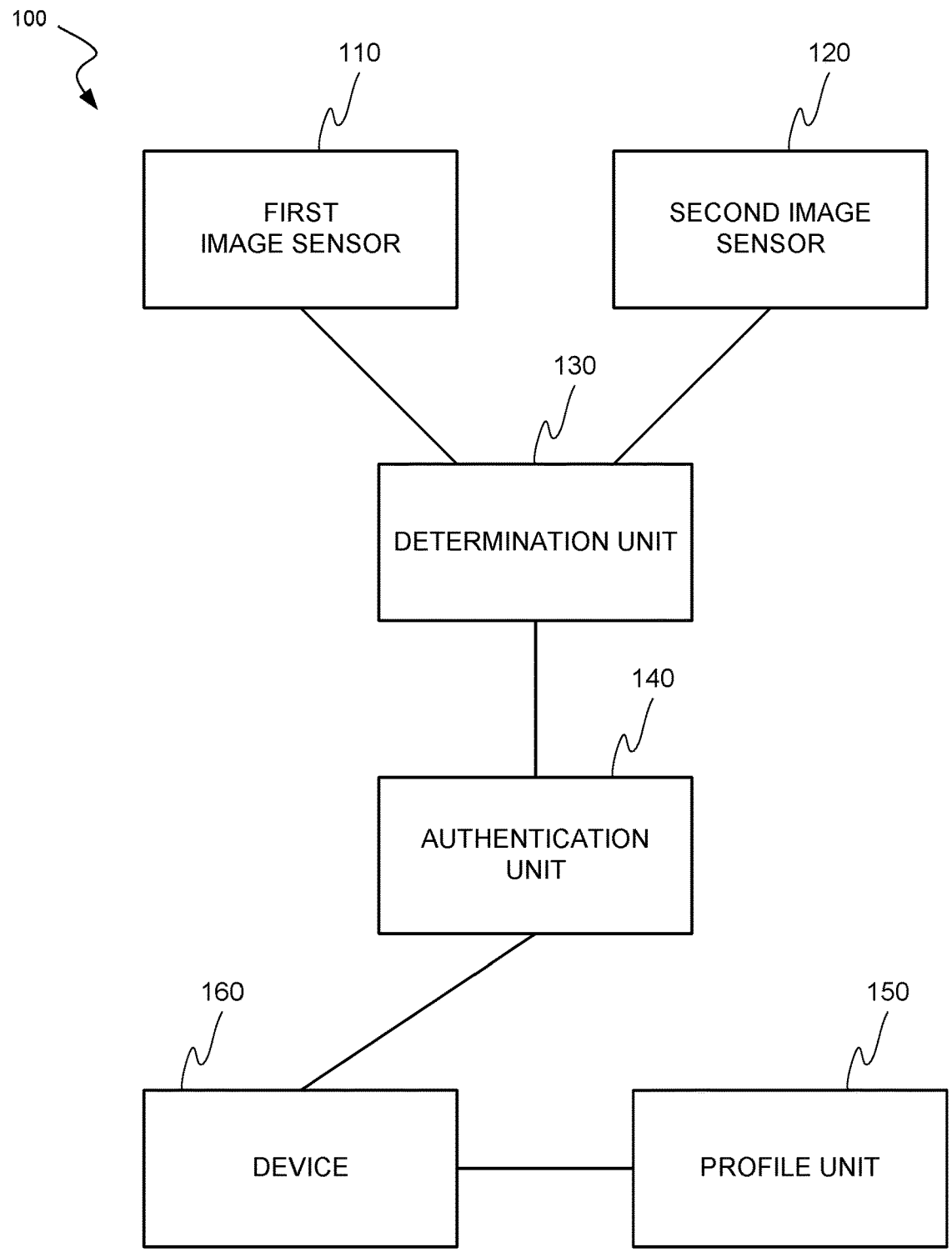
FIG. 1 is a block diagram of one system of one embodiment of the invention for authenticating a user of a device.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth herein.

Specific details are given in the following description to provide a thorough understanding of the embodiments. However, it will be understood by one of ordinary skill in the art that the embodiments may be practiced without these specific details. For example, in any given embodiment discussed herein, any specific detail of that embodiment may or may not be present in all contemplated versions of that embodiment. Likewise, any detail discussed with regard to one embodiment may or may not be present in any potential version of other embodiments discussed herein. Additionally, circuits, systems, networks, processes, well-known circuits, algorithms, structures, and techniques, and other elements in the invention may be discussed without unnecessary detail in order to avoid obscuring the embodiments.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments, a system for authenticating a user is provided, whereby the system utilizes information from a gaze determination device. In exemplary embodiments the gaze determination device is an infrared based eye tracking device such as systems available in the market from Tobii (www.tobii.com) or other suppliers. It may also be possible to use an eye tracking device incorporated in a wearable system such as a Virtual Reality or Augmented Reality headset.

In broad terms, embodiments of the present invention relate to systems for authenticating a user according to the following method: (1) validate a user as present in front of a device using information from an image sensor or eye tracking device, (2) validate that the user is an appropriate user of the device based on facial recognition and/or, provide enhanced validation of the user as an appropriate user of the device by receiving and analyzing gaze and/or eye information, and (3) authenticate the user based on information from the preceding steps.

The image captured by the image sensor may comprise solely the user's eye or eyes, or it may further contain extra information such as the user's face. It is a clear objective of the present invention to allow for usage of any information capable of being captured by an eye tracking device. This information includes, but is not limited to, eye openness, eye position, eye orientation and head orientation. An image containing a user's face may be analyzed using facial recognition algorithms as would be readily understood by one of skill in the art, to identify a user.

Further, it may be advantageous to determine that a captured image pertains to a living person. According to some embodiments, one method of doing so may be to analyze the captured image for the presence of infrared light reflected from the cornea of the user. By using an infrared light based eye tracking device, a glint may be present on the cornea of a user's eye(s) which may be captured using an appropriately configured image sensor.

A further method for determining if the captured image pertains to a living person may be checking a series of captured images. This series of captured images may be analyzed to determine whether a user's gaze point is or is not static. A gaze point which is not static will generally indicate a live person. The analysis may even seek and identify known movements of a living eye such as saccades and/or fixations, including micro saccades.

A further method for determining if the captured image pertains to a living person may be comparing images captured while different light sources are activated. For example an image captured while an infrared light source placed coaxially with an image sensor is activated may have a so-called bright pupil effect, while an image captured while an infrared light source placed non-coaxially with an image sensor is activated will have a so-called dark pupil effect. A comparison of the bright pupil and dark pupil image may be performed to determine the presence of a pupil. In this manner it may be difficult to provide a fake pupil to the system.

Once the system has determined that a user is living and identified that user, it may optionally load a personal calibration profile defining the characteristics of at least one of the persons eyes. This calibration profile may be used to alter the determined gaze direction of the user, for example the calibration profile may provide a standard offset to be applied to all determined gaze directions from the user. Alternatively, the calibration profile may contain data on the characteristics of the user's eye(s), for instance the offset of the fovea relative to the optical axis of the eye or the corneal curvature of the eye. The user may then gaze at an indicator on a display indicating their desire to login to the system, for example a button stating "Login", a small eye catching icon or the like would be suitable.

In a further improvement, the calibration profile may contain further information such as inter-pupillary distance, pupil size, pupil size variations, bright pupil contrast, dark pupil contrast, corneal radius and the like. This information may be pre-existing in the calibration profile or may be incorporated into the calibration profile at the time of analysis to determine if the user is alive. To perform the login (authentication) procedure the user may do one of the following, depending upon the configuration of the system:

In a first embodiment—Look at a series of images or text displayed in a predetermined order thus essentially gazing in a pattern. The pattern having been defined, assigned to, or chosen by, the user previously, such as during a setup phase of the system. Comparison of the previously defined pattern to the pattern presently detected can be used to determine if the user is authenticated.

In a second embodiment—Follow a moving object with their eye(s), potentially a single moving object amongst a series of moving objects. The particular moving object being previously defined, assigned to, or chosen by, the user during a setup phase of the system, and allowing for login of the device if followed by the users eye(s) instead of other objects also displayed.

In a third embodiment—Gaze at different moving objects in a predefined order among a series of moving objects (the predefined order defined, assigned to, or chosen by, the user during a setup phase of the system).

In a fourth embodiment—Fixate on a predetermined object, image, or part of image (the predefined object, image, or portion of image defined, assigned to, or chosen by, the user during a setup phase of the system).

The specific points in a sequence of gaze movements may be defined in terms of the time a user's gaze rests upon each point. Further, the total amount of time taken to complete a sequence may also be used as a decision point to decide if a sequence is legitimate or not.

It may be desirable to include a "reset" function for starting a login procedure, this may be an icon or the like displayed on the screen at which a user must gaze upon, or otherwise activate, to indicate to the system that the user wished to commence a login procedure.

In a further improvement of the present invention, a "panic" authentication mode may be defined by a user. In this mode, the user may set an authenticate sequence that differs from their regular authentication sequence. When this alternative sequence is entered, a computing device may alter its function such as by limiting functionality and information displayed (bank account information, sensitive information and the like), or the computing device may contact a pre-identified emergency contact such as the police service, or a trusted contact. This contact may be via email, telephone, text message or the like.

An authentication procedure as has been previously described may be used for identification and/or authentication for operation of a computing device, or for a service executed on a computing device. By way of example, the identification and authentication procedures herein described are suitable for authenticating a user with websites, applications and the like.

Having a known calibration profile is useful for a login procedure but not essential. In the case of no calibration profile being loaded, it is possible to compare a gaze pattern between several different static and/or one or more moving objects to match the gaze pattern to a known layout of the imagery. In some embodiments, the gaze pattern can simultaneously be used to create a calibration for the device.

In some embodiments, the system may comprise an eye tracking device with multiple illumination sources. The system may operate the eye tracking device such that images are captured while different illumination sources are activated, which will create variation in shadows in the captured image. This shadow image can be used to model the face of the user for more accurate facial recognition. An additional benefit of this embodiment is that it may be difficult to fake a real person using a flat image such as a printed image, as shadows on such a printed image will not alter based on varying illumination sources.

In some embodiments, three dimensional head pose information may be captured by the image sensor. This head pose information may alter over a series of images and may be used to ensure a live person is captured by the image sensor as well as be used by facial recognition algorithms.

In some embodiments, the eye tracking device in the system may comprise two or more image sensors. By capturing images using two or more image sensors, a distance map may be created as would be understood by a person of skill in the art. This distance map may be used to identify a user and may be individual to said user, thus making it more difficult to fake the presence of the user in the captured images.

Alternatively, by capturing images using two or more image sensors, images from two or several (possibly known) viewpoints can be used without the need to create a distance map by ensuring the person is imaged from multiple angles at a single point in time and matching these images to a prerecorded model representing certain aspects of said persons face and/or at least one eye, thus making it more difficult to fake the presence of the user in the captured images. As a further improvement, once a user has been authenticated and is logged in to a system, the device may perform a procedure to ensure the user of the system is still the same user who was authenticated previously. This re-authentication procedure may be performed periodically, or it may be performed in response to a specific event, such as a loss of eye tracking information from an eye tracking device. This procedure may comprise anything herein described in order to compare the user in a captured image, or series of captured images, to the identity of the authenticated user. If the system detects that a user of a device is not the authenticated user, the system may perform one or more of the following actions: notify the user, close an application on the device, remove an item from display on the device, log out of the device, shut down the device, and/or send a notification message to another system or individual.

In an embodiment when periodically performing a procedure to verify that the user using the system is still the same user as the one authenticated during the authentication or login process, the system may further perform an action. The action may be one of the described in the foregoing paragraph or one of the following: notify a third party, whereby the third party may be a security department or police department, advise the operating system or another application to take an image of the unauthorized user using the device or even initiate a lock down of a building. The image may be taken by a camera integrated in the device or by a camera connected to the device. The action may be initiated via the authentication unit and executed by the operating system. In another embodiment the action may be directly executed by the authentication unit, for example via the operating system.

In an embodiment re-authentication of the user may be executed at regular intervals. The intervals for the periodical verification/authentication of the user in front of the device may depend on the application, module or software currently used and also if the user was constantly sitting at the device or if he/she left for a time period. The duration of the time period may determine whether or not the user has to be authenticated when he comes back to the device. Depending on the security clearance of the user the time period may be shortened or extended.

Despite the described duration or time period of absence of the user, the system or authentication may perform authentications at regular intervals while a user is using the device even if the user did not leave his workplace and device in the meantime. The operating system or another application may directly control such intervals and vary them depending on the software, module or application used or started. Depending on the safety-relevance of a content displayed or opened in the device, the intervals may be shortened or extended. For instance in case a banking-, bookkeeping- or file-handling-application or the like is opened and used the intervals for verifying the user may be shortened and an initial authentication may be executed prior to opening the application. When other applications such as TV and movie applications or game applications or other entertainment applications are used such intervals for authentication may be extended or even not be executed when opening such an application. However, when for example a Massively Multiplayer Online Roleplaying Game (MMORPG) is used the interval for authentication of the user using the device may be shortened as explained later herein.

In an embodiment the above described periodical intervals may also be adapted and changed directly by the operating system upon login into a specific application, software or other online service. The operating system may for example continuously verify and asses the websites displayed by the used web browser or the movies watched via movie streaming application. Upon detection of for example a website showing banking content, the operating system may immediately initiate an authentication of the user before showing the content and at the same time initiate a shortening of the intervals for authentication while the banking content is shown. In order to do this the operating system may be electronically coupled to an authentication unit and a determination unit.

In an embodiment the operating system may incorporate a child safety function that is linked to the authentication unit so that a certain content on a website or application is only displayed if the identity of the user is confirmed and if it is further confirmed that the user is not minor. If it is detected that the user, which even may be authenticated, is minor the operating system may shut down the application or close a window of a web-browser.

In general a re-authentication may be performed whenever the head pose information/facial orientation or information relating to the user's eyes is lost and found again in order to guarantee that an authorized user is using the device. When no head pose or face or eye information is detected re-authentication will fail. Re-authentication will be performed once the head pose or face or eye information of the user is recognized or found again after it was lost.

In high secure environments the authentication unit or the determination unit may be used to create a logbook or the like that records every authentication of a user and marks whether it was successful or not. This logbook may also keep track of how long a user and his face or eyes, respectively, was in front of the device after an authentication. The logbook may further note, which user was sitting when and how long in front of the device and it may also note if such a user was authenticated or not.

In some embodiments, any of the systems and methods described herein may be used to log in to a specific application or program rather than to a device. By way of example, in a Massively Multiplayer Online Roleplaying Game (MMORPG), users spend a large amount of time and effort increasing the abilities and characteristics of a computer/virtual character through playing. The present invention may be used to authenticate an owner or authorized operator of a character in the MMORPG. Of course, embodiments of the present invention may suit any form of game or any other software.

Embodiments of the present invention may be suitable for use in any system that requires identification of a user and authentication that said user is an authorized user of the system. Examples of such systems include, but are not limited to, computers, laptops, tablets, mobile phones, traditional land-line phones, vehicles, machinery, secured entryways, virtual reality headsets, and augmented reality headsets.

In some embodiments of the present invention, the authentication procedure may be performed in a virtual reality or augmented reality environment. In this environment it is possible to present to the user objects via a headset or the like, and in two dimensional or simulated three dimensional format. The user may then perform the login procedure by gazing at static or moving objects in the environment, for example in two dimensional or simulated three dimensional space. Or further the user may focus at objects at differing depths in the environment. The user may define the sequence or objects at which the user wishes to gaze as a unique login sequence. Using the sequence at a later time, the device may authenticate the user (in a manner as previously described herein).

In some embodiments, other modalities may be combined with gaze to allow for the creation of a unique login procedure. These modalities may include keyboard, mouse, or touch-based contact such as a touchpad or touchscreen. Further the modalities may include 3D gestures, voice, head pose or specific mechanical input such as buttons. The user may define a procedure that requires gazing at a particular object on a display or within a virtual reality/augmented reality environment while simultaneously enacting a separate modality. By way of example, a user may gaze at an object while speaking a specific passphrase, and/or while performing a particular gesture.

In some embodiments, in order to determine that a user is alive, the systems herein may create an event that triggers dilation of the user's pupil or pupils. For example a display may switch from very dark to very bright or vice versa, a captured image of a user's pupil may then be analyzed to determine if the pupil reacted to the change in light intensity. Further, the sequence, type, or timing of the event could change regularly or between sessions, so as to make it more difficult to account for in the event someone is trying to fool/circumvent the system.

A user's profile, authentication procedure, identity and the like may be stored locally on a computing device and encrypted, or it may be stored remotely and transferred to the local device. The device, such as a gaze tracking device, that captures images of the user must be secure in that no workaround is possible whereby someone can introduce pre-captured images to the system for authentication.

In a further embodiment of the present invention, identification of a user may be combined with other data collected by a computer system. For example, through the use of an eye tracking device or similar, a system according to the present invention may determine the subject of a user's attention and combine this with the identity of the user. By way of description, the system may function in the following manner: (a) a user is identified according to the present invention, (b) the subject of a user's attention is derived and recorded by examining a user's gaze pattern combined with data reflecting information displayed on a screen at the same time the user's gaze pattern was recorded, and (c) the identity of the user is combined with the subject of the user's attention to define attention data.

This attention data may be stored locally on a computer system, or remotely on a remote server. The attention data may be combined with attention data of the same, or different users, to determine representative views of attention towards information.

To further illustrate, this embodiment of the present invention will now be described in the context of a possible use. A computer system equipped with an eye tracking device allows for identification and authentication based on a user's gaze as has been previously described. Once a user has been identified and authenticated, the eye tracking device determines a user's gaze direction in relation to information displayed on the screen. For example the information may be an advertisement. Elements of the user's gaze relative to this advertisement is recorded by the system, the elements including date and time of gaze, duration of dwell, saccade direction, frequency and the like. These elements are combined with the identity of the user and stored by the system. The storage being either locally on the computer system, or transmitted via the internet or the like to a remote server. This may be repeated many times over for the same advertisement in the same location, in different locations, or different advertisements. The information may be in any form capable of being displayed by a computer system, not just an advertisement, it may include images, text, video, web pages and the like.

Once data has been collected for at least two items of information, or from at least two users. The information may be collated to present representative views. For example, by knowing the identity of a user an associated information such as age, gender, location and the like, the present invention may generate reports such as "Dwell time for males aged 15-19" for various pieces of information. A person of skill in the art will readily recognize that by combining the identity of a user, with the subject of that user's attention, many combinations of information may be collected, stored, analyzed and reported upon.

In a further improvement of the present invention, a system according to the present invention may utilized an eye or gaze tracking device to identify and/or authenticate a user, so as to allow the user to operate a computing device. Once authenticated, the system may continuously monitor information captured by the gaze tracking device and check said information for the presence of a person other than the authenticated user in front of the computing device. If another person is located in front of the computing device, the system may cause some information to be obscured or not displayed by the computing device. The identity of the at least one other person need not be known, the mere fact that another person is present may be sufficient. In this manner, when more than just the authenticated user is viewing a computing device, sensitive information such as bank account information and the like may be hidden and protected. The authenticated user may choose to override this functionality through a software override, or identify and authenticate the additional person(s) using the present invention or any other known identification and authentication procedure.

The present invention may further identify and collect behavioral biometrics including, but not limited to, head movement, blink frequency, eye movement such as saccades, eye openness, pupil diameter, eye orientation and head orientation. This information may be collected during the identification and authentication of a user, an also continuously during a user's use of a computing device. Some or all of this information may be saved in the form of a profile for later identification and authentication of the user.

Further, according to the present invention, once a user has been identified and authenticated with a computing device, and that user moves away from the computing device, there may be a need to re-authenticate the user upon returning to the computing device. To implement this, a time period may be defined during which, if an authenticated user returns no re-authentication is needed, but if the time period is exceeded, a re-authentication is needed. Further, the system may identify a returning user using any previously described behavioral biometrics and if the system identifies the new user as a different identity than the authenticated user, or an unrecognized identity, a re-authorization procedure must follow.

On a related note, once a user has been identified and authenticated according to the present invention and that user ceases to use a computing device for a predetermined period, the computing device may enter a "locked" mode. To unlock the computing device, a simplified procedure such as following a moving object may be used.

In a further improvement of the present invention, the system may use information gathered by a gaze tracking device to determine the state of a user. For example, the system may determine the level of brightness in the user's environment, the level of brightness emitted from the display of a computing device and calculate an expected pupil size of a user. The system may also, or instead, use historical information regarding the pupil size of the particular user. The system may then determine the mental state of a user based on their pupil size. For example an enlarged pupil may indicate a surprised or excited state, or even the presence of mind altering substances.

Any reference in the present invention to gaze or eye information may be substituted in some circumstances with information relating to user's head. For example, although the resolution is likely not as high, it may be possible to identify and authenticate a user using only their head orientation information. This could further extend to expressions, blinking, winking and the like on a user's face.

Although the present invention is described with reference to a computing device having an eye tracking device comprising an image sensor, it should be understood that such systems exist in many forms. For example an eye tracking device may contain all necessary computational power so as to control a display or computing devices directly. For example an eye tracking device may contain an application-specific integrated circuit (ASIC) which may perform all or part of the necessary algorithmic determinations as required by the present invention.

It can happen during the authentication for a device that a user faces problems as his head may not be correctly aligned with an image sensor or the like. In this case head, facial or eye recognition and thus authentication may not function properly.

In another embodiment there may be a guiding unit present, which guiding unit helps the user who wants to login into the device to position his head/face/eyes in a position that allows an authentication by the system. The guiding unit may be a directing unit and it may facilitate the authentication process. The guiding unit may be active in the background of a system so that it can immediately be activated once the operating system or an authentication unit requires an authentication of a user. Preferably the guiding unit is an item of software code that operates standalone or as part of an operating system. Alternatively the guiding unit may be idle when no authentication is performed and it may then be activated once the operating systems and/or the authentication unit initiates an authentication of a user.

The guiding unit may be used to visually guide the user for example via a display or with light beams of a light source. Such visual guidance may include but is not limited to guiding the user by using colors, signs, light and dark contrasts or other optical measures such as a region of clear region(s) and blurred out region(s).

A field of vision of a user may be determined via the gaze detection using at least a first image sensor and a determination unit. The field of vision is generally defined by the view encompassed by the eyes of a user/person when he looks into a certain direction. In the context herein the field of vision indicates the region, which a user can see sharp and clear. The field of vision may be the sharpened field visual for a person/user when he is focusing on a certain region or spot. The field of vision may be calculated by a processor, whereby the processor uses the input from the at least first image sensor and/or the determination unit. A second image sensor may further be used to determine the field of vision of a user. The field of vision may be calculated by a determination unit using information relating to the user's head pose, facial orientation or information relating to the user's eye. The field of vision may be visualized using colors, signs, light contrasts or other optical measures such as a region of a clear pattern. The region or area not covered by the field of vision may be indicated by another color, a darkened region, a blurred out pattern, as explained further herein.

The field of vision may be shown or signaled relating to a display or screen. Alternatively the field of vision may be shown or signaled relating to at least first and/or second image sensor.

As an example, illumination or darkened areas may be used to indicate the field of vision of a user sitting at the device, for example in front of it, the user's field of vision may be indicated with an illuminated spot whereas other regions may be shown darkened. This may for example be done with a display or screen; —it may however also be done with other light sources such as light sources arranged for example in a pattern around a camera(s), imaging device(s) or image sensor(s) whereby said camera(s), imaging device(s) or image sensor(s) may be used to authenticate the user. The pattern of light sources may be symmetrically arranged around said camera(s), imaging device(s) or image sensor(s) and indicating the user's head pose/face orientation or information relating to the user's eye or gaze by illuminating appropriate light sources. Such patterns of lightened and darkened regions may also be applied when a screen or display is used to guide the user.

In an embodiment the user may be guided by color for example a green color, such green color or region of green color being used to visually illustrate the field of vision of the user on a display or screen and another color, red for example, to indicate a region at which the user is currently not focusing at. Any color combination and blurring may be used.

In another embodiment the visual guidance of the guiding unit may involve the blurring out of regions that are currently not in the field of vision of the user and sharpening regions that are in the field of vision of the user.

In an embodiment a second image sensor may be used to improve accuracy of the guiding unit and/or provide three dimensional information.

In an embodiment a track box may be defined by the system, which track box represents a region of an image sensor or image sensors in which region the image sensor(s) are able to track a user, in particular a head pose of the user. The track box may have a three dimensional shape or it may be two dimensional. Preferred is a three dimensional shape. The track box may be defined by the system or by an authorized user or another authorized third party. The shape of the track box may alternatively be defined by the sensitivity, aperture and other technical features of the image sensor(s). The track box may be positioned at a certain distance from an image sensor. Said distance may be defined by a region in which the image sensor can see "sharp" similar to a human eye or it may be chosen by the system or the authorized user/third party. The cross sectional shape of the track box as seen from the image sensor may be rectangular, round, elliptic or any combination thereof. It may also be chosen by the system or the authorized user/third party. In an embodiment the cross section of the track box as seen from the image sensor is increasing when the distance between a cut cross section and the image sensor increases. There may however be a distance limit for the track box. In an embodiment the distance limit may also be chosen by the system or an authorized user/third party. In another embodiment the distance limit may be given by the image sensor and may represent a distance at which the image sensor cannot identify or "see" an object sharp any longer. In both cases, thus a user's head is too close to the image sensor(s) and therefore outside of a boundary of the track box towards the sensor or if the user's head is too far away from the image sensor and therefore outside of a boundary of the track box away from the sensor, the image sensor may still be able to recognize the head of the user but not its orientation or pose. In these cases, the guiding unit may guide the user's head towards the image sensor, when the user's head is out of the track box away from the image sensor, or the guiding unit may guide the user's head away from the image sensor, when the user's head is out of the track box towards the image sensor. The head's pose or position may thus be determined with respect to the track box and/or the image sensor.

The guiding into the track box in both cases, the user's head is too far away from the image sensor(s) and thus outside the boundary of the track box or the user's head is too close to the image sensor(s) and thus outside the boundary of the box, may be done in a visual, acoustic or tactile manner. Visual guidance may for example comprises moving illuminated spots/regions towards an object for example on a screen or moving them away from the object for example on the screen. In this case, the illuminated spot or other visual signal may move towards an opposite side of a display to the edge of the track box, which the user has exceeded. For example, if a user has moved to the right of a track box, an illuminated spot or visual signal may move towards the left of the display. In this manner the illuminate spot or visual signal may draw a user's eyes towards it and the user may inadvertently lean towards the spot, thus re-entering the track box. Acoustic guidance may for example comprise various volumes of the sound generated. A loud volume may signal the user to move away from the image sensor(s) whereas a low volume may signal the user to move towards the image sensor(s). The tactile signal may include similar patterns using for example low frequency vibrations and high frequency vibrations. Other possible guiding methods and patterns falling within the scope of the invention are herewith included.

In an embodiment the guiding unit may use acoustic or sound signals in order to guide the user. The acoustic or sound signals may include any tone or sound. This may especially be advantageous if the user is blind. The acoustic signals may be emitted from a surround sound system that is coupled to the guiding unit. Alternatively, the guiding unit may be coupled to a plurality of loudspeakers positioned so that they allow to acoustically guide the user during the authentication.

In an embodiment the guiding unit may use tactile signals for guiding a user. Such tactile signals may be embossed printing/braille or vibrations of any sort. The embossed signals or vibrations may for example indicate the user's field of vision in view of the device and/or the first—and/or second image sensor, respectively.

As an example if the user's field of vision or head/facial/eye orientation is detected to be towards a left of an image sensor, the illuminated, colored or sharp region or spot, the acoustic signal or the vibration(s) may be generated to the left of the user to indicate to the user that he has to turn his head towards his right. If the user's field of vision or head/facial/eye orientation is detected towards the ground or downwards, the illuminated, colored or sharp region or spot, the acoustic signal or the vibration(s) may be generated so that they originate from the ground or below to indicate to the user that he has to lift his head upwards. The guiding of the user may of course be vice versa as explained below, thus if the user's field of vision is detected to be too much towards his left the signal may be generated to his right to indicate to the user in which direction he has to turn his head/face/eyes in order to allow an authentication.

As another example if the user's field of vision or head/facial/eye orientation is detected to be towards a left of an image sensor, the illuminated, colored or sharp region or spot, the acoustic signal or the vibration(s) may be generated to the right of the user to indicate to the user that he has to turn his head towards his right and to draw his attention to the illuminated, colored or sharp region or spot. If the user's field of vision or head/facial/eye orientation is detected towards the ground or downwards, the illuminated, colored or sharp region or spot, the acoustic signal or the vibration(s) may be generated so that they originate from an upper region above the user to indicate to the user that he has to lift his head upwards. The guiding of the user may thus be done either way by drawing his attention to an object or away from an object. The object may be generated on a screen or via a projector of any kind.

In general the user may be guided by drawing his attention towards the visual, acoustic or tactile signal or by drawing his attention away from the visual, acoustic or tactile signal.

In the embodiments, which use an acoustic or tactile signal, the successful authentication or the unsuccessful authentication may be signaled to the user via a specific sound or a specific vibration sequence.

The guiding unit may enhance user friendliness when a facial recognition system is used for authentication, such as for example Windows Hello™. The assistance of the guiding unit during authentication may lead to a smooth and comparably quick authentication of a user.

The guiding unit may comprise light/visual sources and/or loudspeakers and/or vibrating devices for guiding the user. Alternatively the guiding unit may be connected to such light/visual sources and/or loudspeakers and/or vibrating devices.

As indicated in the foregoing paragraphs, the light or visual source may be light emitting diodes, a display such as a screen, color sources such as a screen or any other sort of visual guiding device such as signs, etc.

The guiding unit may get the information regarding the user's head pose or facial orientation or gaze/eyes from a determination unit. Preferably the guiding unit uses thereby the head pose information of the user, alternatively it may also use information regarding the user's face orientation or gaze/eyes for guiding the user.

In an embodiment the guiding unit may be implemented and included in a computer system as described previously.

FIG. 1 is a block diagram of one system 100 of one embodiment of the invention for authenticating a user of a device. As described above, the system may include a first image sensor 110, a second image sensor 120, a determination unit 130, an authentication unit 140, a profile unit 150, and a device 160 (for which the user is being authenticated). While communication channels between components have been shown as lines between various components, those of skill in the art will understand that other communication channels between components may be present and not shown in this particular example.

Figure 2:
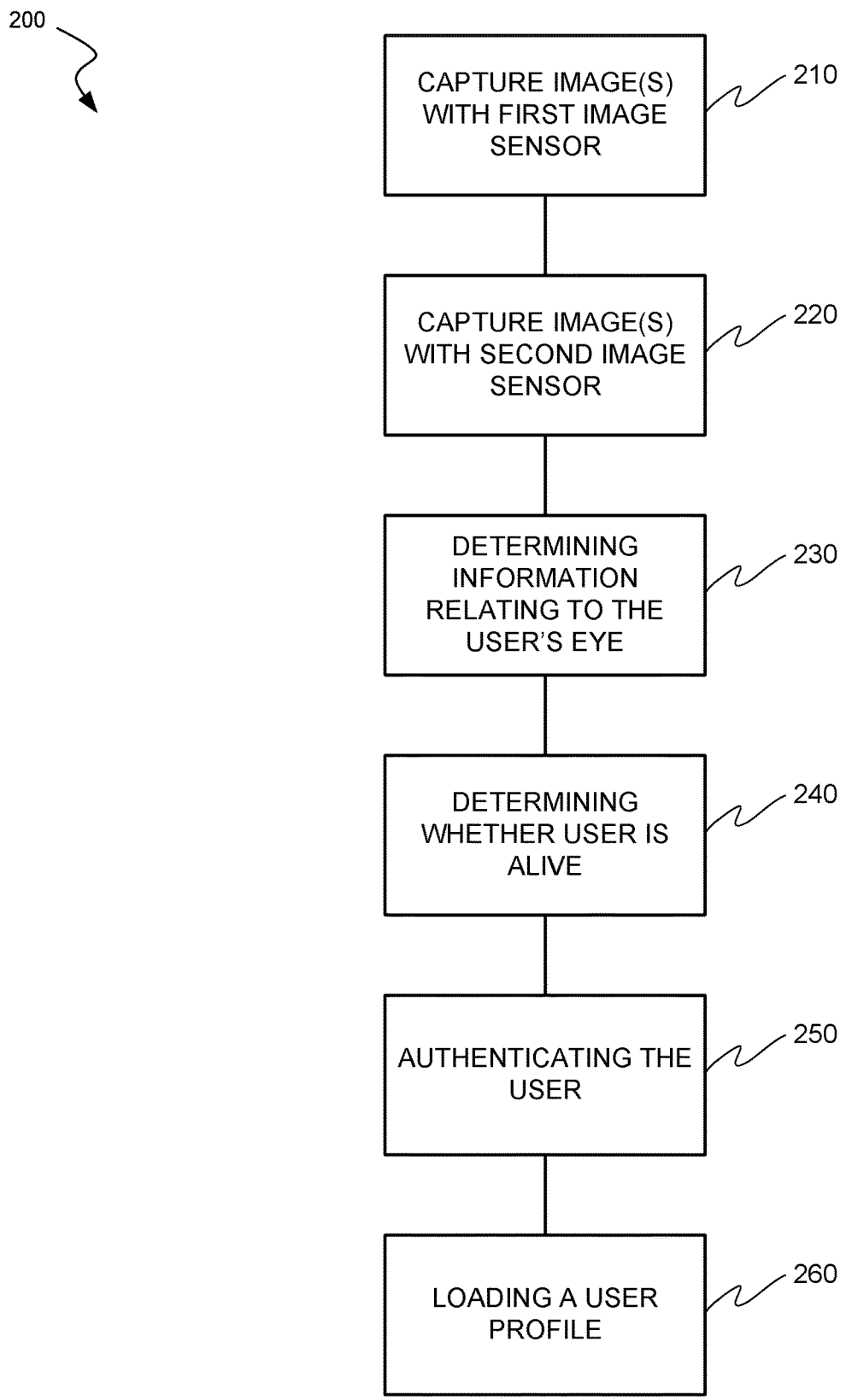
FIG. 2 is a block diagram of one method of one embodiment of the invention for authenticating a user of a device.

FIG. 2 is a block diagram of one method 200 of one embodiment of the invention for authenticating a user of a device. As described above, the method may include, at step 210, capturing image(s) with a first image sensor. At step 220, image(s) may be captured with a second image sensor. At step 230, information may be determined relating to the user's eye from the image(s). At step 240, it may be determined whether the user is alive based on the preceding acquired information and determinations. At step 250, also based on the preceding acquired information and determinations, it may be determined whether to authenticate the user. At step 260, a user profile may be loaded based upon authentication of the user.

Figure 3:
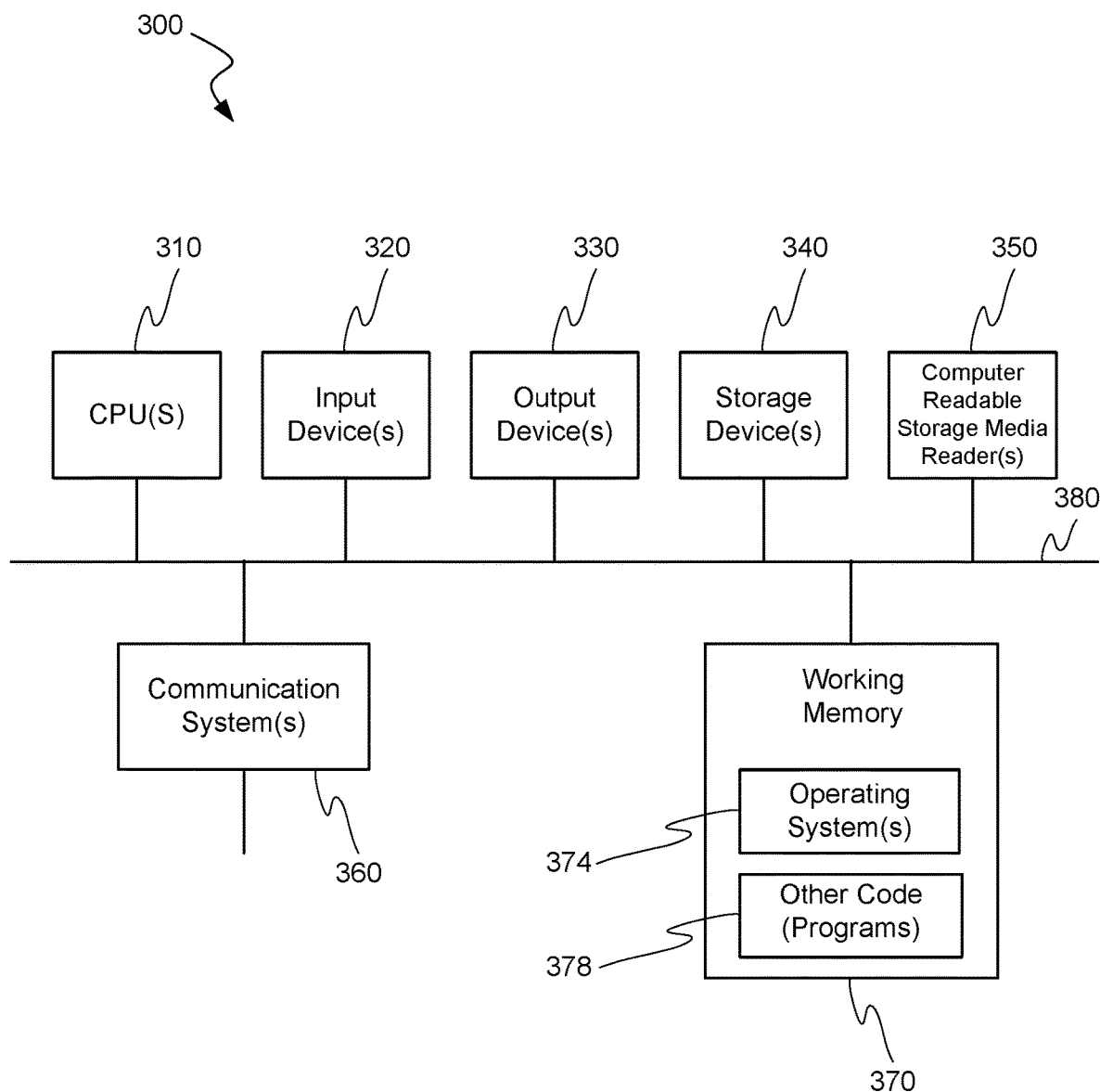
FIG. 3 is a block diagram of an exemplary computer system capable of being used in at least some portion of the apparatuses or systems of the present invention, or implementing at least some portion of the methods of the present invention.

FIG. 3 is a block diagram illustrating an exemplary computer system 300 in which embodiments of the present invention may be implemented. This example illustrates a computer system 300 such as may be used, in whole, in part, or with various modifications, to provide the functions of any of the systems or apparatuses discussed herein. For example, various functions of the eye tracking device may be controlled by the computer system 300, including, merely by way of example, gaze tracking and identification of facial features, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of the eye tracking device, and/or other components of the invention such as those discussed above. Methods implementable by software on some of these components have been discussed above in more detail.

Figure 4:
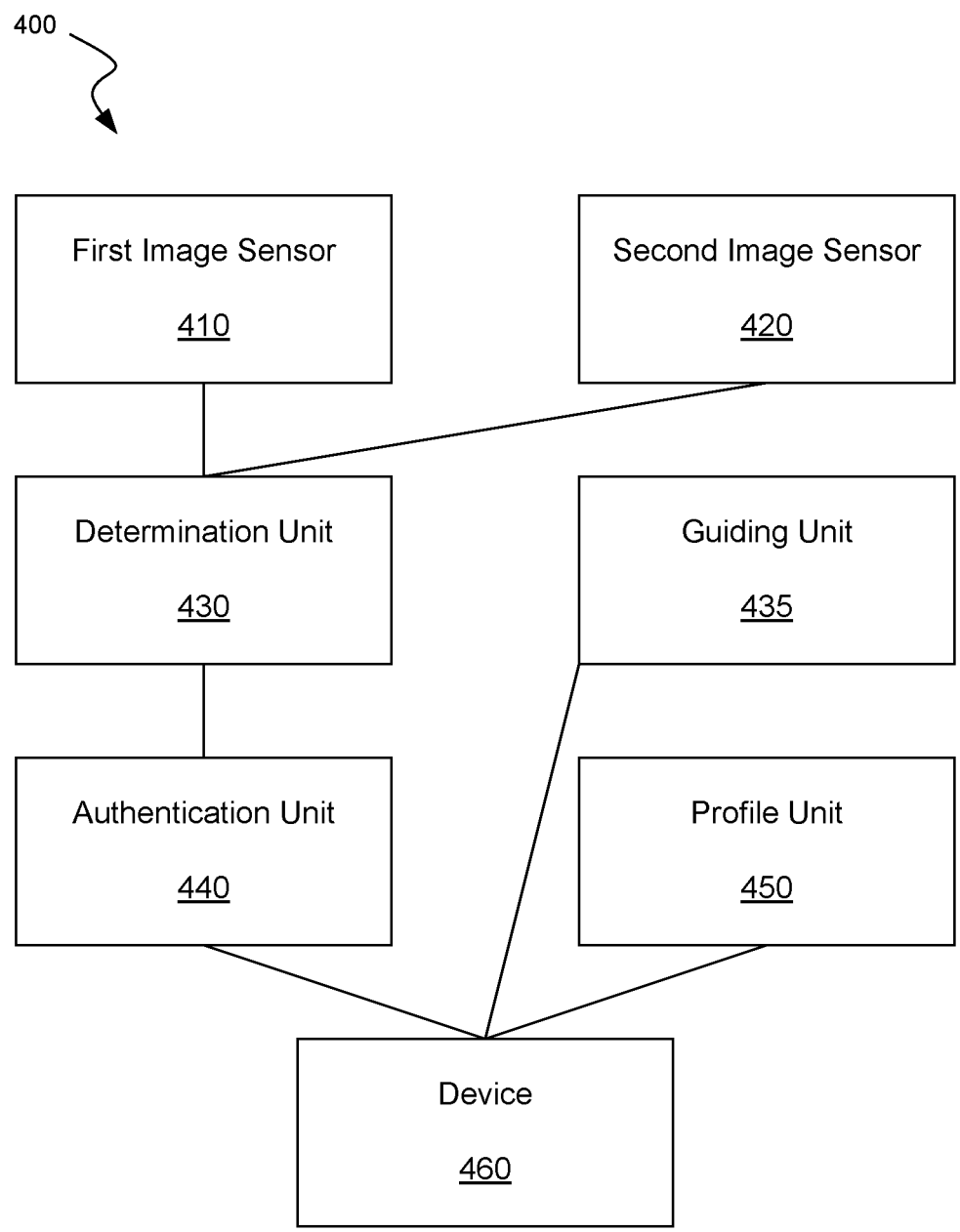
FIG. 4 is a block diagram of one system of one embodiment of the invention for authenticating a user of a device.
Figure 5:
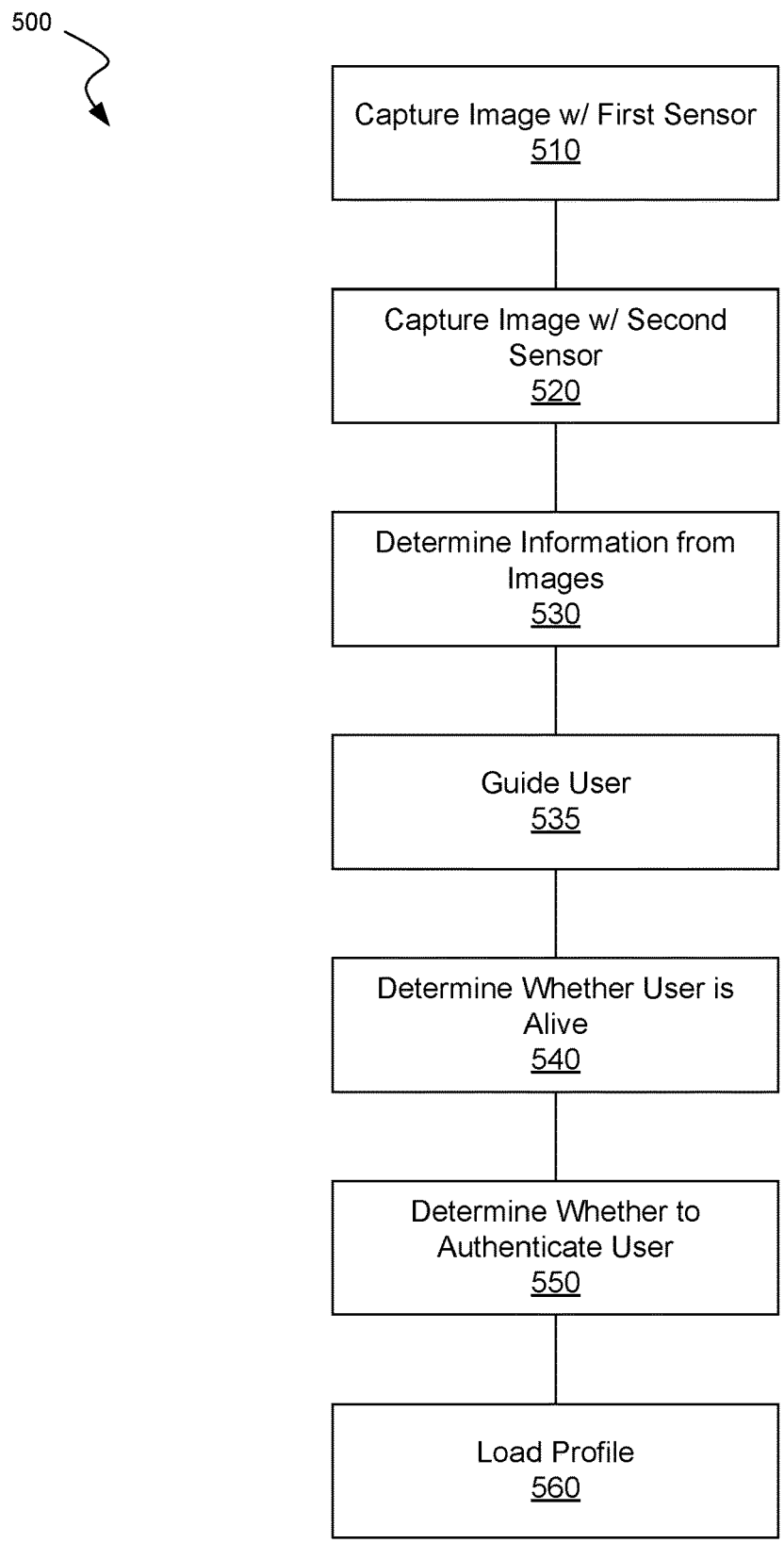
FIG. 5 is a block diagram of one method of one embodiment of the invention for authenticating a user of a device.

The computer system 300 as described referring to FIG. 3, may also include a guiding unit 435 as shown and described referring to FIGS. 4 and 5.

FIG. 4 is a block diagram of one system 400 of one embodiment of the invention for authenticating a user of a device. As described above, the system may include a first image sensor 410, a second image sensor 420, a determination unit 430, a guiding unit 435 an authentication unit 440, a profile unit 450, and a device 460 (for which the user is being authenticated). While communication channels between components have been shown as lines between various components, those of skill in the art will understand that other communication channels between components may be present and not shown in this particular example.

FIG. 5 is a block diagram of one method 500 of one embodiment of the invention for authenticating a user of a device. As described above, the method may include, at step 510, capturing image(s) with a first image sensor. At step 520, image(s) may be captured with a second image sensor. At step 530, information may be determined relating to the user's eye, facial orientation or head pose from the image(s). At step 535 the user may be guided so that his eyes/gaze, facial orientation or head pose is in a good position for authentication, as described above. At step 540, it may be determined whether the user is alive based on the preceding acquired information and determinations. At step 550, also based on the preceding acquired information and determinations, it may be determined whether to authenticate the user. At step 560, a user profile may be loaded based upon authentication of the user.

FIGS. 4 and 5 illustrate the guiding unit 435 to be arranged after the determination unit 430 and the guiding step 535 arranged to be after the determination step 530. It falls however within the scope of the invention that these units and steps are arranged in any other sequence.

Although the system and method shown in FIGS. 1, 2, 4 and 5 is illustrated comprising and using a first and a second image sensor, it falls within the scope and spirit of the invention that the system/method and the invention, respectively, only comprises and uses one single image sensor. Another possibility is of course that the system and method comprises and uses more than two image sensors. The embodiments illustrated in the FIGS. 1, 2, 4 and 5 illustrate one possible embodiment of the invention. Any other embodiment that can be conceived by the skilled person falls under the scope of the invention.

The invention has now been described in detail for the purposes of clarity and understanding. However, it will be appreciated that certain changes and modifications may be practiced within the scope of the appended claims.

What is claimed is:

1. A system for authenticating a user of a device, the system comprising:
a first image sensor for capturing at least one image of at least part of a user;
a determination unit for determining information relating to the user's eye based at least in part on at least one image captured by the first image sensor; and
an authentication unit for authenticating the user using the information relating to the user's eye, wherein the authentication unit is for executing an action upon detection of an unauthorized user; and
a profile unit for:
loading an eye tracking calibration profile based on the user being authenticated by the authentication unit, the eye tracking calibration profile storing an offset;
performing a login procedure using the eye tracking calibration profile and gaze information determined by the determination unit as part of the login procedure, wherein the login procedure comprises:
presenting one or more virtual objects;
receiving, from the determination unit, the gaze information that defines characteristics of the eye when viewing the one or more virtual objects; and
confirming the characteristics of the eye with eye information from the eye tracking calibration profile; and
altering future gaze information of the eye of the user based at least in part on the eye tracking calibration profile, the future gaze information determined by the determination unit as part of tracking the eye of the user after completion of the login procedure.

2. The system according to claim 1, wherein the determination unit is further for determining whether the user is alive based at least in part on at least one image captured by the first image sensor.

3. The system according to claim 2, wherein the authentication unit executes re-authentications of the user when the authenticated user using the device leaves and returns to the device or when the information relating to the user's eye is lost.

4. The system according to claim 3, wherein the re-authentication is only executed after a defined time period, during which information of the user's eye is lost.

5. The system according to claim 1, comprising a second image sensor for capturing at least one image of at least a part of the user.

6. The system according to claim 5, wherein the determination unit compares an image captured by the first image sensor with an image captured by the second image sensor.

7. The system according to claim 1, wherein the action includes notifying the user.

8. The system according to claim 1, wherein the action includes closing an application on the device.

9. The system according to claim 1, wherein the action includes removing an item from display on the device.

10. The system according to claim 1, wherein the action includes logging out of the device.

11. The system according to claim 1, wherein the action includes notifying a third party.

12. The system according to claim 1, wherein the action is executed by an operating system of the device and wherein the operating system is notified by the authentication unit.

13. The system according to claim 12, wherein the operating system shuts down the device.

14. The system according to claim 1, wherein the action includes taking a picture of the unauthorized user by the at least first image sensor.

15. A system for authenticating a user of a device, the system comprising:
a first image sensor for capturing at least one image of at least part of a user;
a determination unit for determining information relating to the user's head pose and eyes based at least in part on at least one image captured by the first image sensor;
an authentication unit for authenticating the user using information relating to the user's eyes;
a guiding unit; wherein
the determination unit is further for determining whether the user is alive based at least in part on at least one image captured by the first image sensor and wherein the head pose information is used by the guiding unit for guiding the user during authentication so that the head of the user is in the right position for authentication; and a profile unit for:
loading an eye tracking calibration profile based on the user being authenticated by the authentication unit, the eye tracking calibration profile storing an offset;
performing a login procedure using the eye tracking calibration profile and gaze information determined by the determination unit as part of the login procedure, wherein the login procedure comprises:
presenting one or more virtual objects;
receiving, from the determination unit, the gaze information that defines characteristics of the eye when viewing the one or more virtual objects; and
confirming the characteristics of the eye with eye information from the eye tracking calibration profile; and
altering future gaze information of the eye of the user based at least in part on the eye tracking calibration profile, the future gaze information determined by the determination unit as part of tracking the eye of the user after completion of the login procedure.

16. The system according to claim 15, wherein the guiding unit is for generating visual signals to guide the user.

17. The system according to claim 15, wherein the guiding unit is for generating sound signals to guide the user.

18. The system according to claim 15, wherein the guiding unit is for generating tactile signals to guide the user.

19. The system according to claim 15, comprising a second image sensor for capturing at least one image of at least a part of the user.

20. The system according to claim 19, wherein the determination unit compares an image captured by the first image sensor with an image captured by the second image sensor.

21. The system according to claim 19, wherein the guiding unit is coupled to the at least first image sensor and/or the second image sensor.

22. The system according to claim 15, comprising a track box, said track box being defined by the system and/or a third party, the track box defining a three dimensional shape representing a region, in which the at least first image sensor can determine the head pose of the user.

23. A method for authenticating a user of a device, the method comprising:
capturing at least one image of at least part of a user with a first image sensor;
determining information relating to the user's eye based at least in part on at least one image captured by the first image sensor;
authenticating the user using information relating to the user's eye;
loading an eye tracking calibration profile based on authenticating the user, the eye tracking calibration profile storing an offset;
performing a login procedure using the eye tracking calibration profile and gaze information determined as part of the login procedure, wherein the login procedure comprises:
presenting one or more virtual objects;
receiving the gaze information that defines characteristics of the eye when viewing the one or more virtual objects; and
confirming the characteristics of the eye with eye information from the eye tracking calibration profile; and
altering future gaze information of the eye of the user based at least in part on the eye tracking calibration profile, the future gaze information determined as part of tracking the eye of the user after completion of the login procedure; and
executing an action upon detection of an unauthorized user.

24. The method according to claim 23, wherein the method further comprises determining whether the user is alive based at least in part on at least one image captured by the first image sensor.

25. The method according to claim 24, wherein the method further comprises determining head pose information for the user.

26. The method according to claim 23, wherein the method further comprises re-authenticating of the user when the user leaves and returns to the device.

27. The method according to claim 23, wherein the method further comprises re-authenticating of the user using the device when the information relating to the user's eye is lost.

28. The method according to claim 23, wherein the method further comprising re-authenticating the user only after a defined time period, during which the user was not authenticated or not present at the device.

29. The method according to claim 23, wherein the method further comprises re-authenticating the user at regular time intervals.

30. The method according to claim 29, wherein the time intervals are shortened or extended, depending on the content currently displayed by the device.

31. The method according to claim 23, wherein the method further comprises capturing at least one image of at least part of the user with a second image sensor.

32. The method according to claim 23, wherein executing an action comprises one or more of the following: notifying the authenticated user, closing an application on the device, removing an item from display on the device, logging out of the device and/or notifying a third party.

33. The method according to claim 23, wherein executing an action comprises shutting down the device.

34. The method according to claim 23, wherein executing an action comprises taking a picture of the unauthorized user.

35. The method according to claim 23, wherein executing an action includes initiating a lock down of a building.

36. A method for guiding a user of a device during authentication, the method comprising:
capturing at least one image of at least part of a user with a first image sensor;
determining information relating to the user's head pose and the user's eye based at least in part on at least one image captured by the first image sensor;
determining whether the user is alive based at least in part on at least one image captured by the first image sensor;
guiding the user using the information relating to the user's head pose;
loading an eye tracking calibration profile based on authenticating the user, the eye tracking calibration profile storing an offset;
performing a login procedure using the eye tracking calibration profile and gaze information determined as part of the login procedure, wherein the login procedure comprises:
presenting one or more virtual objects;
receiving the gaze information that defines characteristics of the eye when viewing the one or more virtual objects; and confirming the characteristics of the eye with eye information from the eye tracking calibration profile; and
altering future gaze information of the eye of the user based at least in part on the eye tracking calibration profile, the future gaze information; and
authenticating the user using information relating to the user's eye.

37. The method according to claim 36, wherein the guiding comprises generating visual signals.

38. The method according to claim 36, wherein the guiding comprises generating sound signals.

39. The method according to claim 36, wherein the guiding comprises generating tactile signals.

40. The method according to claim 36, comprising capturing at least one image of at least a part of the user via second image sensor.

41. The system according to claim 40, comprising comparing an image captured by the first image sensor with an image captured by the second image sensor.

42. The method according to claim 36, wherein the guiding comprises a combination of generating visual signals and/or sound signals and/or tactile signals.

43. The method according to claim 36, comprising the step of defining a track box, which represents a three dimensional region in which the head pose of the user can be determined, and guiding the user in relation to at least said track box.

44. The method according to claim 43, wherein guiding the user in relation to said track box includes the step of guiding the user into the track box using visual-, acoustical- or tactile signals.

45. A non-transitory machine readable medium having instruction stored therein for authenticating a user of a device, wherein the instructions are executable by one or more processors for performing the steps of claim 23.

46. A non-transitory machine readable medium having instructions stored therein for guiding a user of a device during authentication, wherein the instructions are executable by one or more processors for performing the steps of claim 36.

* * * * *